United States Patent

Blase

[11] Patent Number: 6,156,974
[45] Date of Patent: Dec. 5, 2000

[54] FLEXIBLE RACEWAY FOR ENERGY LINES

[75] Inventor: Gunter Blase, Bergisch Gladbach, Germany

[73] Assignee: Igus Spritzgussteile fur die Industrie GmbH, Germany

[21] Appl. No.: 09/125,325

[22] PCT Filed: Feb. 10, 1997

[86] PCT No.: PCT/DE97/00246

§ 371 Date: Apr. 6, 1999

§ 102(e) Date: Apr. 6, 1999

[87] PCT Pub. No.: WO97/30299

PCT Pub. Date: Aug. 21, 1997

[30] Foreign Application Priority Data

Feb. 16, 1996 [DE] Germany ............ 196 05 775

[51] Int. Cl.[7] .............. H02G 3/04; F16G 13/00
[52] U.S. Cl. ............ 174/68.3; 174/69; 174/135; 59/78; 59/78.1
[58] Field of Search .......... 174/68.3, 69, 135; 59/78.1, 78; D13/140

[56] References Cited

U.S. PATENT DOCUMENTS

| | | | |
|---|---|---|---|
| 3,590,854 | 7/1971 | Cork | 137/355.16 |
| 3,779,003 | 12/1973 | Boissevain et al. | 59/78.1 |
| 4,462,565 | 7/1984 | Johnson | 248/51 |
| 5,178,247 | 1/1993 | Vagaggini | 191/12 C |
| 5,257,961 | 11/1993 | Wehler et al. | 474/144 |
| 5,343,989 | 9/1994 | Hu et al. | 191/12 R |
| 5,649,415 | 7/1997 | Pea | 59/78.1 |
| 5,890,357 | 4/1999 | Blasé | 59/78.1 |

*Primary Examiner*—Kristine Kincaid
*Assistant Examiner*—W. David Walkenhorst
*Attorney, Agent, or Firm*—Reising, Ethington, Barnes, Kisselle, Learman & McCulloch, P.C.

[57] ABSTRACT

A chainlink raceway (1) for cables and hoses is disclosed having an upper portion with non-inverted chain links which overlies a lower portion with inverted chain links and having a turnaround portion of more than 180° and which joins the upper and lower portions and inverts the links as they move from the upper portion to the lower portion. The raceway has chain links provided with links. Plural webs side-by side form a comb-like structure on the bottom of the chain links. The webs on the links in the upper portion interleave with the webs on the links in the lower portion so that the engaged chain links (2) are secured against transverse displacement relative to one another.

22 Claims, 3 Drawing Sheets

FLEXIBLE RACEWAY FOR ENERGY LINES

CROSS REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to a flexible raceway for cables and the like, the chain links of which are articulated to one another and comprise opposing side walls and upper and lower transverse webs or walls connecting those side walls.

BACKGROUND OF THE INVENTION

If the flexible raceway has a relatively long travel and guide channels in which the upper and lower halves of the chain are laid are not used, lateral deviation from the straight course of the chain occurs owing to the axial play of the chain links relative to one another. This leads to the sliding edges of the side walls of upper half of the chain sliding over the outside of the lower transverse webs or transverse walls so that these relatively thin components may be abraded and, in the worst case, destroyed. Furthermore, if there are relatively great deviations form the straight course, the chain may tilt or fall off the side. If there are relatively great lateral deviations, the hinge connections of the chain links are also placed under excessive strain.

In the prior art a flexible raceway is known which forms a lower, approximately rectilinear portion (lower half) which is adjoined, via a turn-around region of more than 180°, by an upper, slack region (upper half) of which the lower side slides at least partially on the upper side of the lower half, and some chain links being provided with guide stops which prevent lateral movement of the opposite half of the chain.

U.S. Pat. No. 5,860,274 granted Jan. 19, 1999 has already disclosed a flexible raceway which forms a lower, approximately rectilinear portion (lower half) which is adjoined, via a turn-around region of more than 180°, by an upper, slack region (upper half) of which the lower side slides at least partially on the upper side of the lower half, and some chain links being provided with guide stops which prevent lateral movement of the opposite half of the chain energy guide chains comprising chain links which have, on the outer side of at least one side wall, a guide stop which is constructed, for example, as a slide-like guide stop, star handle or one- or two-armed lever, the guide stops being movable to a limited extent in the plane of the outer side of the chain link side walls or in a plane parallel thereto. In the chain region in which the upper half slides on the lower half, the side walls of the opposite half are overlapped and guided in the running direction of the chain by the guide stops so that, at least in that region, lateral deviations are no longer possible. If during the travel of the flexible raceway the guide stops of the upper half of the chain co-operate with those of the lower half in such a manner that the guide stops of the upper half are turned, pivoted upwards or displaced upwards, the rate of travel of the flexible raceway is limited thereby, because otherwise the holds of the guide stops would be exposed to excessive loads. In addition, the co-operation of the guide stops at high rates of travel entails considerable noise development. This is especially the case when the flexible raceway starting from its connection point, is extended fully in both directions, so that, during travel, each of the guide stops of the upper half of the chain is moved and thus contributes to noise emission. Furthermore, when guide stops are arranged on the side of the side walls, the additional broadening of the flexible raceway and the irregular outer contour, which can easily lead to the side projections' hooking into one another, are disturbing.

The problem of the invention is to provide guiding for flexible raceway in the case of which the above-mentioned disadvantages are eliminated and which, especially, has no troublesome side projections and is easy and inexpensive to manufacture.

BRIEF SUMMARY OF THE INVENTION

This problem is solved according to the invention in that the guide stops are in the form of webs extending in the longitudinal direction of the chain and at least one guide stop on the chain links of one half of the chain engages between two guide stops on the chain links of the opposite half of the chain, so that the engaged chain links are secured against transverse displacement relative to one another.

An especially preferred embodiment provides for a large number of guide stops which form a comb structure extending over the width of the chain links, the web-form guide stops of the chain links of one half of the chain engaging in complementary U-shaped intermediate spaces between the guide stops of the chain links of the opposite half.

Hereinafter, the present invention is explained by way of example and described with reference to the drawing.

DETAILED DESCRIPTION OF THE INVENTION

Figures 1, 2A:
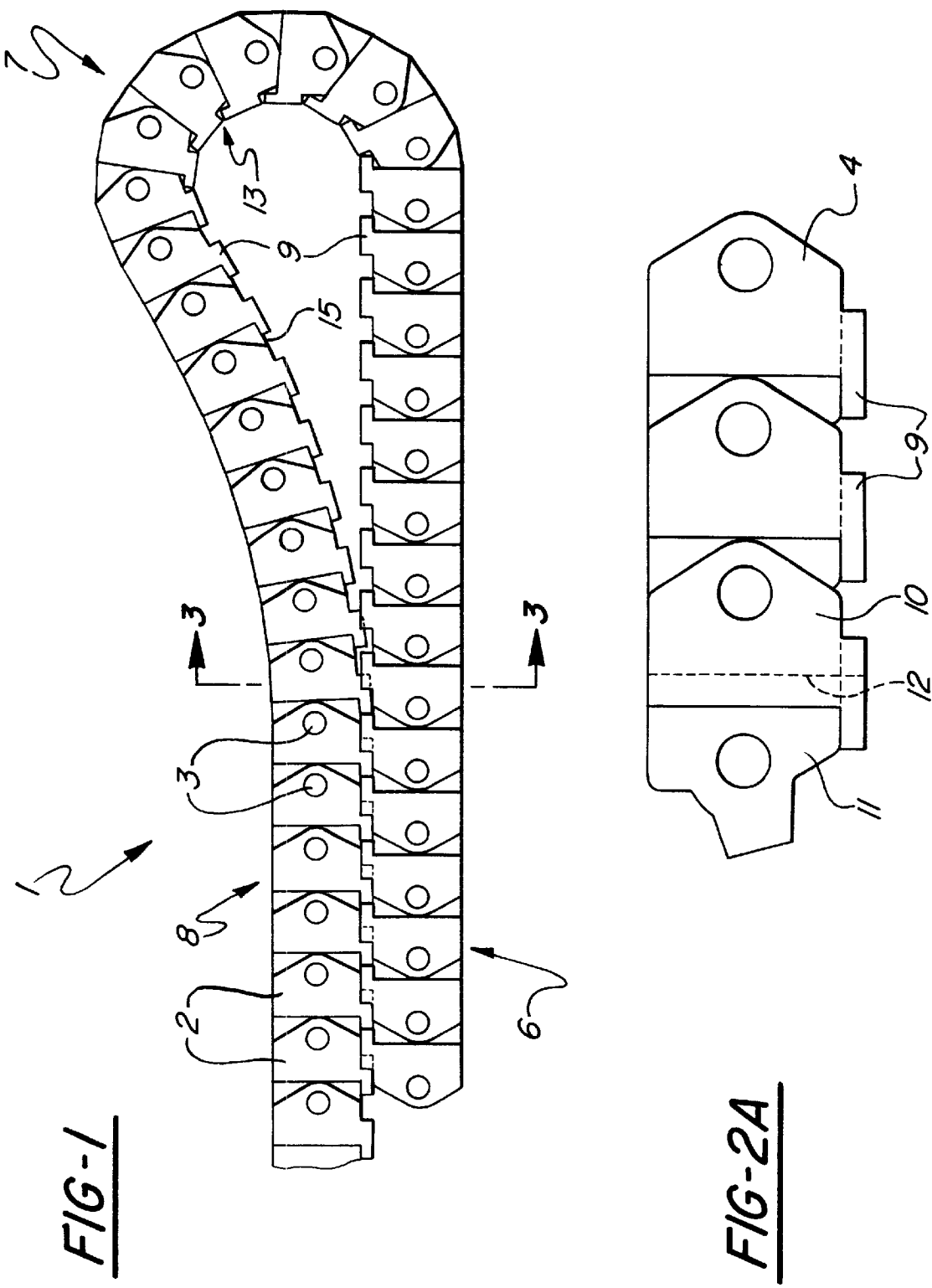
FIG. 1 shows a flexible raceway which comprises a lower half, a turn-around region and an upper half and the links of which have guide stops on the side facing the opposite half of the chain.
FIG. 2A shows a cutout portion of the flexible raceway according to FIG. 1 in side view.
Figure 2B:
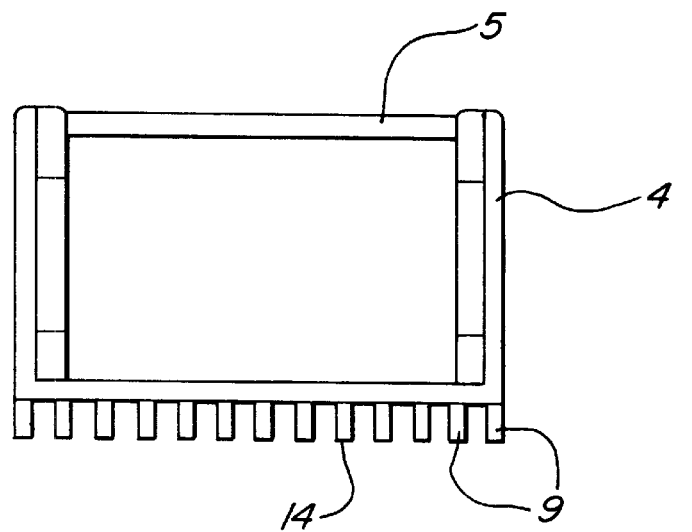
FIG. 2B shows a cross-section of FIG. 2A.
Figure 2C:
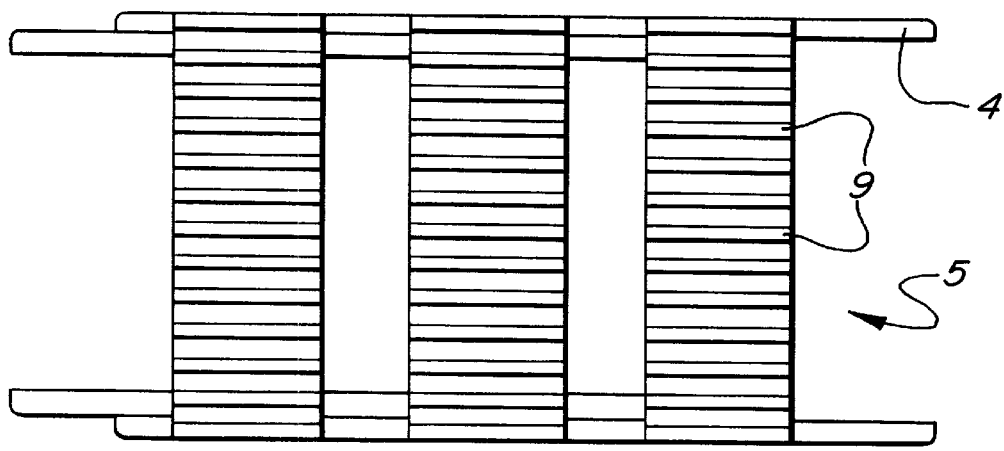
FIG. 2C shows a plan view of FIG. 2A.
Figure 2D:
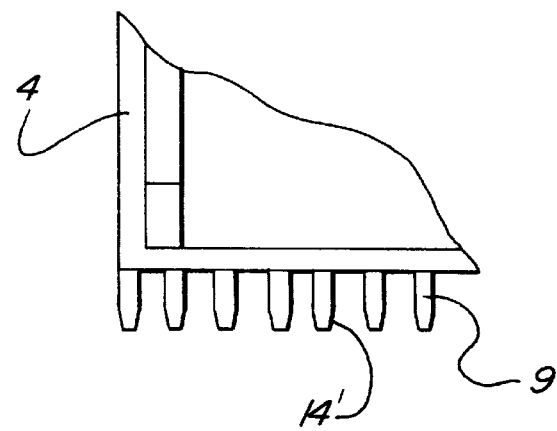
FIGS. 2D and 2E show alternate constructions.
Figure 2E:
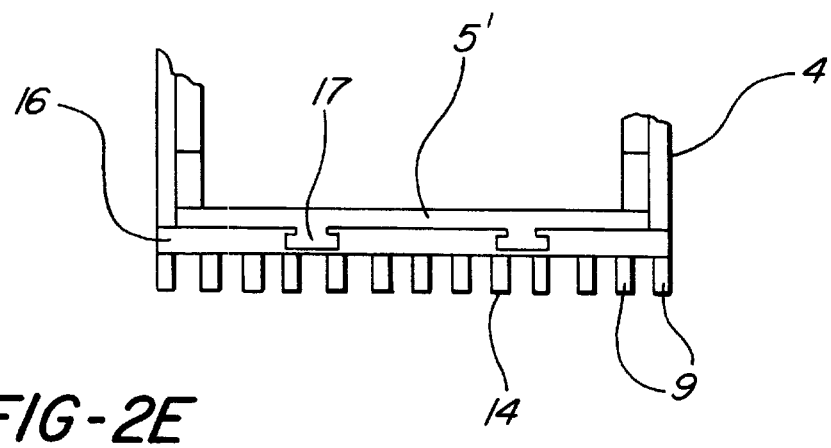
Figure 3:
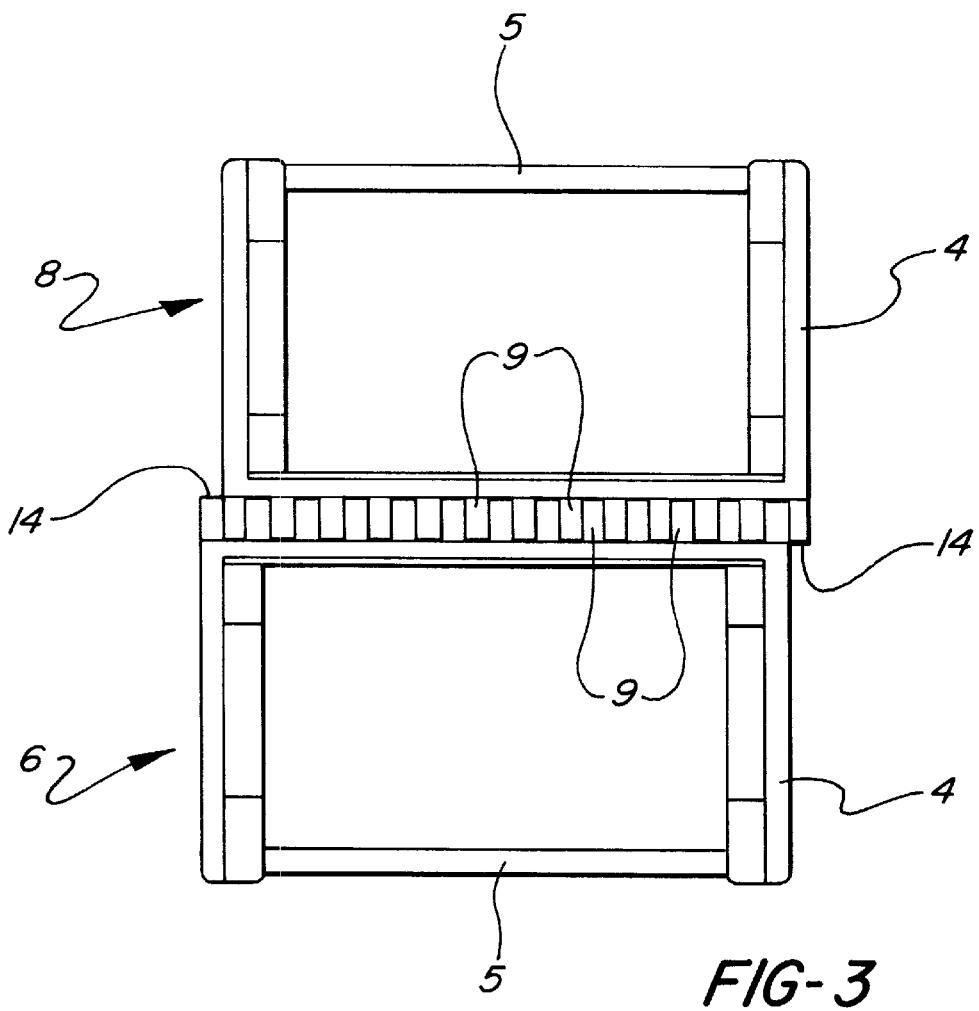
FIG. 3 is a cross-section through the flexible raceway according to FIG. 1 on the section A—A with the upper half of the chain disposed on the lower half.

The flexible raceway 1 shown in FIGS. 1 to 3 comprises a large number of links 2 which are connected to one another at their ends, in such a manner that they are pivotable to a limited extent, by means of articulation bolts or linkage 3. The chain links 2 comprise offset side walls 4 which are connected to one another by upper and lower transverse webs 5.

The flexible raceway 1 comprises a lower half 6 which makes a transition into an upper half 8 via a turn-around region 7. The chain links of the upper half and the lower half of the chain have an identical construction and are provided with guide stops 9 which prevent lateral movement of the lower half relative to the upper half.

It has been found sufficient for many sizes of chain link to provide web-like guide stops that are approximately 5 mm high and that are 2–3 mm wide.

As is shown especially in FIG. 2, A the side walls 4 have an offset-out region 10 and an offset-in region 11, the guide stops 9 extending at the level of the lower edge of the side portions 4 (according to the view A of FIG. 2) over the offset-in region 11 and partially over the offset-out region 10. Relative to the central plane 12 which lies centrally between the articulation regions of a chain link, the guide stops 9 are offset in the direction towards a respective articulation region linkages of the chain links. The length of the guide stops 9 in the longitudinal direction of the chain is such that, taking into account the bending radius of the flexible raceway in the turn-around region 7 (see FIG. 1), the guide stops 9 do not obstruct the angling of adjacent chain links relative to one another, and the pivotability of the chain links is restricted only by the stops provided for the purpose. Therefore, in the turn-around region 7, there is still a small distance between the guide stops 9 of consecutive chain links at the regions marked with the reference numeral 13. The guide stops may also have a shape other than the rectangular shape shown and may, for example, be trapezoidal in longitudinal section, it also being possible for the slanting sides of the trapezium to be constructed as angled abutment faces for adjacent guide stops.

As shown in FIG. 2B, guide stops 9 are in the form of rectangular webs having plane-parallel outer faces and are arranged at identical distances from one another on the mutually opposing transverse webs 5 of the chain links 2. The guide stops 9 form a comb structure which may be described as being composed of a large number of U-sections or webs, the limbs of the U-sections being formed by the guide stops 9 and the base of the U-sections being formed by the transverse web 5. In this embodiment, the guide stops 9 are manufactured from the same plastics material as the chain links and are formed in one piece with the transverse webs 5. An alternative embodiment, shown in FIG. 2E has the guide stops secured releasably to the chain links. Separate carriers 16 with which the guide stops are, for example, formed in one piece may be provided for this purpose, the carriers 16 being releasably securable to the chain links, for example to the transverse webs 5'. Securing may be effect, for example, by means of locking connections 17.

As shown in FIG. 3, the comb structures, formed by the guide stops 9, of chain links of the upper half 8 of the chain are disposed in the intermediate spaces of the comb structure of the chain links of the lower half 6 of the chain, so that lateral movement of the chain links of the lower and upper halves relative to one another is restricted or prevented. The spacing and width of the guide stops 9 are such that, being only slightly smaller than the opposing intermediate spaces, the guide stops are guided between the guide stops of the opposite half of the chain.

If the upper half 8 of the chain is guided in a sliding manner on the lower half 6, the end faces 14 of the guide stops are supported on the transverse webs or transverse walls of the opposing chain links. Overall, therefore, almost the entire width of the chain links is available as a bearing face, so that, in contrast to flexible raceway known hitherto, in the case of which only the narrow sides of the side walls, or skids provided thereon, are supported on one another, an especially large bearing face and thus a low-wear embodiment are provided.

As shown in FIG. 1, when the flexible raceway is turned around, the chain links of the region of the turn-around region 7 running out into the upper half 8 of the chain are passed over the chain links of the lower half 6 of the chain. If this takes place without lateral offsetting of the chain links relative to one another, the end faces 14 of the guide stops 9 of the upper half 8 of the chain are supported on those of the guide stops of the lower half 6 of the chain. Owing to the ever present articulation play transverse to the axis of the chain links one behind the other, however, a sliding movement of the guide stops 9 on one another occurs only over a small portion of the path of travel. The guide stops 9, with lateral offsetting of the chain links in the lower and upper halves of the chain relative to one another, are then threaded into the intermediate spaces of the comb structure of the chain link beneath, so that the arrangement, shown in FIG. 3, of the upper and lower halves of the chain is present at the level of section A—A. The threading-in operation is facilitated by bevelled end faces 14 of the guide stops 9 as shown in FIG. 2D. Alternatively, the end faces of the guide stops can be rounded. If the arrangement, shown in FIG. 3, of the upper and lower halves of the chain relative to one another is present in a portion of the flexible raceway then the comb structures of the respective following chain links are readily threaded in as the flexible raceway travels and, because the length of the guide stops 9 in the longitudinal direction of the chain exceeds the length of the intermediate spaces 15 in the opposite half of the chain, once the comb structures have been threaded in, the guide stops are easily guided in the respective track without their having to act on one another, for example by means of run-on slopes, or without their having to change their position relative to the chain links to which they are secured. Overall, this ensures that the flexible raceway travels with a very low degree of noise, even at a high rate of travel. In addition, if the guide stops are secured in a fixed manner to the chain links, the present embodiment also requires very little maintenance.

The guide stops can be arranged on the outer regions of the upper side of the chain links of the lower half of the chain or of the lower side of the chain links of the upper half of the chain. Guiding for prevention of transverse movement therefore advantageously takes place at the outer regions of the chain. The guide stops may, however, also be arranged in other regions of the upper side of the upper half of the chain or of the lower side of the upper half of the chain.

The guide stops are preferably constructed as double webs in the form of U-sections, the intermediate spaces of which complement the webs. "Complement" in this contest is intended to mean that the webs and intermediate spaces between the webs are in a form such that they co-operate to prevent transverse movement of the chain links. Of course, the intermediate spaces may be larger to a greater or lesser extent than the width of the webs so that slight transverse movement, which does not substantially impair the straight guiding of the chain links lying above one another, is permitted.

At the transition of the lower half of the chain into the upper half, the webs of the contacting chain links are first positioned above one another with spacing between. As the flexible raceway travels further, the webs of the mutually contacting chain links of the upper and lower halves of the chain seat on one another. Owing to the articulation play transverse to the axis of the chain links, a lateral offsetting of the chain links lying above one another takes place as the flexible raceway travels so that their webs engage in the manner of a comb in the U-shaped intermediate spaces of the opposing chain links with the result that one limb of each chain link is guided between two limbs of the opposing chain link and further lateral movement of the opposing chain links is prevented.

The comb structure extending over the width, preferably the entire width, of the chain links also has the advantage that it permits an especially large bearing face of the mutually contacting webs and U-shaped intermediate spaces and this gives rise to an especially low degree of abrasive wear on the guide stops. Especially when the web ends and the base of the U-shaped intermediate spaces are in the form of flat slide faces, the entire width of the chain links is available as a bearing face and therefore as a slide face, so that, at a given weight of the upper half of the chain, there is only a slight surface pressing of the components on one another and thus an embodiment exhibiting an especially low degree of wear is provided.

The length of the guide stops in also advantageously such that, when the upper and lower halves of the chain are in an extended arrangement, the guide stops exceed the length of the intermediate spaces existing between guide stops of consecutive chain links of the opposite half of the chain. When the lower half of the chain makes a transition via the turn-around region into the upper half of the chain, it is necessary to thread only the guide stops of the first chain link of the upper half of the chain between the guide stops of the lower half. The guide stops of the following chain links are then already in their threading position and can be readily arranged between the guide stops of the opposite half of the chain. This guiding of the guide stops provides for especially low-noise and especially smooth and trouble-free travel of the flexible raceway, which permits a very high rate of travel. In particular, separate positioning of the guide stops of each chin link by interaction with the guide stops of chain links of the opposite half of the chain is not necessary, unlike the case of guide stops that are arranged on the outer side of the chain link side walls and that move under the action of the guide stops of the opposite half of the chain in the plane of the outer side and are conveyed into their desired position.

The length of the guide stops can also be smaller than the length of the intermediate spaces between guide stops of the opposite half of the chain (but while forfeiting smooth running) because the lateral offsetting of the chain links, especially when the rate of travel is high, is generally not so great that the guide stops come out of their track when passing through the intermediate space between the guide stops of adjacent chain links.

Advantageously, the guide stops are of a length such that they do not hinder the angling of adjacent chain links relative to one another, and the pivoting of adjacent chain links relative to one another is limited only by the stops provided for the purpose.

In order not to obstruct the angling of adjacent chain links in the turn-around region, the guide stops should be offset from the central plane of the side portions in the direction towards one of the articulation regions of the chain links. The central plane is the plane arranged centrally between the articulation regions of a chain link perpendicularly to the longitudinal direction of the flexible raceway.

In order to facilitate the threading of the guide stops of one half of the chain between the guide stops of the opposite half of the chain during the seating thereof, the upper or lower outer sides of the guide stops may be beveled or the guide stops may have a trapezoidal cross-section or the like. In order also to facilitate the tracking of the guide stops of one half of the chain between those of the opposite half of the chain during the travel of the flexible raceways, the end faces of the guide stops may also be bevelled.

Advantageously, the guide stops are formed in one piece with the side of the chain links that faces the opposite half of the chain. The guide stops can be formed, for example, on the transverse webs which are non-releasably connected, for example, injected-moulded, to the side walls. The guide stops may, however, also be formed in one piece with other components, for example with the narrow sides of the chain link side portions.

In the case of a flexible raceway having releasable transverse webs, the guide stops may advantageously be formed in one piece with the transverse webs. In that case, flexible raceways are especially easy to retrofit with suitable guide stops by exchanging the transverse webs.

On the other hand, it is also possible to have embodiments in the case of which the guide stops are secured releasably to the chain links. Separate carriers with which the guide stops are, for example, formed in one piece may be provided for this purpose, the carriers being releasably securable to the chain links, for example to the side portions or the transverse webs. Securing may be effected, for example, by means of locking or clamping connections.

Chain links in the sense of the present invention are to be understood as being both chain links having transverse webs releasably secured to the side walls and chain links having transverse webs formed in one piece with the side walls. The transverse webs may also have a larger extent in the longitudinal direction of the chain so that the inner space of the flexible raceway is almost completely enclosed.

Also to be included are flexible raceways composed of a continuous, for example extruded, flexible molded body in the case of which the cabin links are formed, for example, as a result of the fact that the outer wall and the side walls of the molded body are separated by recesses, the molded body wall that is on the inside in the turn-around region being substantially in the form of a continuous belt. The articulations connecting the chain links to one another are substantially in the form of film or strap hinges owing to the resilient deformability of the material of the energy guide chain.

Finally, the invention is to include embodiments in the case of which the guide stops are movable to a limited extent on the chain links. The webs extending in the longitudinal direction of the chain may be held (and may be displaceable in parallel manner), for example, in slots which extend transversely to the chain links and which are provided, for example, on the transverse webs. The length of the slots may be such that the webs of the chain links which abut one another can move out of each other's way and can be moved past one another by displacement in the slots, optionally by means or run-on slopes arranged on the end faces. The movement of the webs is restricted by the ends of the slots so that, as guide stops sliding against one another at their sides, they prevent transverse movement of the chain links lying on top of one another. Automatic transition of the guide stops, for example, from the slot ends that are on the inside relative to the middle of the chain link, to the outer ends of the same during the passage of the chain links from the upper half of the chain to the lower half and vice versa is also rendered possible in that the slots are inclined in a slanting position along the transverse direction of the chain links, so that the displaceable guide stops are positioned as a result of gravity on the lower end of the slot, that is to say, in the lower half of the chain, for example on the outer ends of the slots and, in the upper half of the chain, on the inner ends of the slots.

What is claimed is:

1. In a chain-link raceway of the type having chain links which comprise opposing side walls and upper and lower transverse webs connecting the side walls, said links being connected to one another by an articulation linkage (3), said raceway comprising a lower portion which is approximately rectilinear and which extends into a turn-around portion of more than 180°, said lower portion having an upper side, said raceway also comprising an upper portion extending from said turn-around portion and having a lower side which slides at least partially on the upper side of the lower portion, said chain links being provided with guide stops which restrict relative lateral movement of said lower and upper portions of said raceway, the improvement wherein there are a plurality of guide stops (9) each in the form of a web extending in the longitudinal direction of the raceway with at least one guide stop (9) on some chain links (2) in one of said lower and upper portions (6 or 8) being disposed between a pair of guide stops (9) on webs on oppositely disposed chain links (2) in the other of said lower and upper portions (8 or 6) so that the chain links (2) are restricted against transverse displacement relative to one another.

2. A chain-link raceway according to claim 1, wherein the guide stops (9) are disposed on the outer regions of the upper side of the chain links of the lower portion of the raceway or on the lower side of the chain links of the upper portion of the raceway.

3. A chain-link raceway according to claim 2, wherein the guide stops (9) are arranged as at least one pair of spaced webs in the form of a U-section, whereby one of the webs on one of the lower and upper portions is disposed between said pair of spaced webs on the other of the lower and upper portions.

4. A chain-link raceway according to claim 1, wherein there is a plurality of a large number of guide stops (9) which form a comb structure extending over the width of the chain links (2), the guide stops (9) of the chain links (2) of one of the lower and upper portions engaging in complementary U-shaped intermediate spaces between the guide stops (9) of the chain links (2) of the other of the lower and upper portions.

5. A chain-link raceway according to any one of claims 1, 2, 3 or 4, wherein, the length of the guide stops (9) exceeds the length of the intermediate spaces (15) between the guide stops of consecutive chain links (2) in a part of the raceway which is substantially straight.

6. A chain-link raceway according to any one of claims 1, 2, 3 or 4, wherein the guide stops (9) are offset from the central plane (12) of the side walls (4) in the direction towards an articulation link of the chain links (2).

7. A chain-link raceway according to any one of claims 1, 2, 3 or 4, wherein the upper or lower outer sides of the guide stops (9) are bevelled.

8. A chain-link raceway according to any one of claims 1, 2, 3 or 4, wherein the guide stops (9) are formed in one piece with the chain links (2).

9. A chain-link raceway having releasable transverse webs according to any one of claims 1, 2, 3 or 4, wherein the guide stops (9) are formed in one piece with the transverse webs (5).

10. A chain-link raceway according to any one of claims 1, 2, 3 or 4, wherein the guide stops (9) are secured releasably to the chain links (2).

11. A chain-link raceway according to any one of claims 1, 2 3 or 4, wherein the length of the guide stops (9) exceeds the length of the intermediate spaces (15) between the guide stops of consecutive chain links (2) in a part of the raceway which is substantially straight, and wherein the guide stops are offset from the central plane (12) of the side walls (4) in the direction towards an articulation region of the chain links (2).

12. A chain-link raceway according to any on of claims 1, 2, 3 or 4, wherein, the length of the guide stops (9) exceeds the length of the intermediate spaces (15) between the guide stops of consecutive chain links (2) in a part of the raceway which is substantially straight, and wherein the upper or lower outer sides of the guide stops (9) are bevelled.

13. A chain-link raceway according to any one of claims 1, 2, 3 or 4, wherein the guide stops are offset from the central plane (12) of the side walls (4) in the direction towards an articulation linkage of the chain links (2), and wherein the upper or lower outer sides of the guide stops (9) are bevelled.

14. A chain-link raceway according to any one of claims 1, 2, 3 or 4, wherein the length of the guide stops (9) exceeds the length of the intermediate spaces (15) between the guide stops of consecutive chain links (2) in a part of the raceway which is substantially straight, and wherein the guide stops (9) are formed in one piece with the chain links (2).

15. A chain-link raceway according to any one of claims 1, 2, 3 or 4, wherein guide stops are offset from the central plane (12) of the side walls (4) in the direction towards an articulation linkage of the chain links (2), and wherein the guide stops (9) are formed in one piece with the chain links (2).

16. A chain-link raceway according to any one of claims 1, 2, 3 or 4 wherein the upper or lower outer sides of the guide stops (9) are bevelled, and wherein the guide stops (9) are formed in one piece with the chain links (2).

17. A chain-link raceway having releasable transverse webs according to any one of claims 1, 2, 3 or 4 wherein the length of guide stops (9) exceeds the length of the intermediate spaces of (15) between the guide stops of consecutive chain links (2) in a part of the raceway which is substantially straight and wherein the guide stops are formed in one piece with the transverse webs (5).

18. A chain-link raceway having releasable transverse webs according to any one of claims 1, 2, 3 or 4, wherein the guide stops are offset from the central plane (12) of the side walls (4) in the direction towards an articulation linkage of the chain links (2), and wherein the guide stops (9) are formed in one piece with transverse webs (5).

19. A chain-link raceway having releasable transverse webs according to any one of claims 1, 2, 3 or 4, wherein the upper or lower outer sides of the guide stops (9) are bevelled, and wherein the guide stops (9) are formed in one piece with the transverse webs (5).

20. A chain-link raceway according to any one of claims 1, 2, 3 or 4, wherein the length of the guide stops (9) exceeds the length of the intermediate spaces (15) between the guide stops of consecutive chain links (2) in a part of the raceway which is substantially straight, and wherein the guide stops (9) are secured releasably to the chain links (2).

21. A chain-link raceway according to any one of claims 1, 2, 3 or 4, wherein the guide stops are offset from the central plane (12) of the side walls (4) in the direction towards an articulation linkage of the chain links (2), and wherein the guide stops (9) are secured releasably to the chain links (2).

22. A chain-link raceway according to any one of claims 1, 2, 3 or 4, wherein the upper or lower outer sides of the guide stops (9) are bevelled and wherein the guide stops (9) are secured releasably to the chain links (2).

* * * * *